(12) United States Patent
Nakamori et al.

(10) Patent No.: US 9,419,263 B2
(45) Date of Patent: Aug. 16, 2016

(54) BATTERY PACK

(71) Applicant: MITSUBISHI JIDOSHA KOGYO KABUSHIKI KAISHA, Tokyo (JP)

(72) Inventors: Yoji Nakamori, Gamagori (JP); Kenji Yanagi, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 373 days.

(21) Appl. No.: 13/939,409

(22) Filed: Jul. 11, 2013

(65) Prior Publication Data

US 2014/0017538 A1 Jan. 16, 2014

(30) Foreign Application Priority Data

Jul. 13, 2012 (JP) ................. 2012-157494

(51) Int. Cl.
*H01M 2/20* (2006.01)
*H01M 2/10* (2006.01)

(52) U.S. Cl.
CPC ............ *H01M 2/1077* (2013.01); *H01M 2/206* (2013.01); *H01M 2/1083* (2013.01)

(58) Field of Classification Search
CPC .. H01M 2/1077; H01M 2/1083; H01M 2/206
USPC ...................................... 429/99, 87
See application file for complete search history.

(56) References Cited

U.S. PATENT DOCUMENTS

| | | | |
|---|---|---|---|
| 6,275,003 B1 | 8/2001 | Marukawa et al. | |
| 2003/0066694 A1 | 4/2003 | Mita et al. | |
| 2008/0314657 A1 | 12/2008 | Ikeda et al. | |
| 2009/0061305 A1 | 3/2009 | Nishida et al. | |
| 2010/0266887 A1 | 10/2010 | Sekino et al. | |
| 2010/0273040 A1 | 10/2010 | Kubota et al. | |
| 2011/0269008 A1* | 11/2011 | Houchin-Miller | B60L 11/1874 429/120 |
| 2011/0287298 A1 | 11/2011 | Park et al. | |
| 2012/0100401 A1* | 4/2012 | Yasui | H01M 2/105 429/7 |
| 2015/0270517 A1 | 9/2015 | Yasui et al. | |

FOREIGN PATENT DOCUMENTS

| | | |
|---|---|---|
| CN | 1277462 A | 12/2000 |
| CN | 202217719 U | 5/2012 |
| EP | 2 388 845 A1 | 11/2011 |
| JP | 11-180172 A | 7/1999 |
| JP | 2009-004323 A | 1/2009 |

(Continued)

*Primary Examiner* — Mark F Huff
*Assistant Examiner* — Monique Wills
(74) *Attorney, Agent, or Firm* — Birch, Stewart, Kolasch & Birch, LLP

(57) ABSTRACT

A battery pack includes battery modules. The battery modules are arranged adjacent to each other in a vehicle anteroposterior direction in such a manner that a longitudinal direction of each battery module corresponds to a vehicle width direction. Bus bars for electrically connecting in series positive and negative electrode terminals of the adjacent battery modules include outer bus bars in an outer part in the vehicle width direction, and inner bus bars in a center part in the vehicle width direction. The outer bus bars are provided so as not to protrude from upper faces of the battery modules thereby to interconnect the electrode terminals of the adjacent battery modules, and the inner bus bars are provided so as to pass above the upper faces of the battery modules thereby to interconnect the electrode terminals of the adjacent battery modules.

5 Claims, 7 Drawing Sheets

(56) References Cited

FOREIGN PATENT DOCUMENTS

| | | |
|---|---|---|
| JP | 2009-59473 A | 3/2009 |
| JP | 2009-87720 A | 4/2009 |
| JP | 2009-99490 A | 5/2009 |
| JP | 2009-146881 A | 7/2009 |
| JP | 2011-086634 A | 4/2011 |
| WO | WO 2009/066661 A1 | 5/2009 |
| WO | WO 2011/104792 A1 | 9/2011 |

* cited by examiner

BATTERY PACK

CROSS-REFERENCE TO RELATED APPLICATION(S)

This application is based upon and claims the benefit of priority from prior Japanese patent application No. 2012-157494, filed on Jul. 13, 2012, the entire contents of which are incorporated herein by reference.

BACKGROUND

The present invention relates to a battery pack for mounting a battery on a vehicle such as an electric vehicle or a hybrid vehicle, and more particularly, to a battery pack which is disposed under a floor of a vehicle body and contains a plurality of battery modules.

In an electric vehicle which uses an electric motor as a driving source, or a hybrid vehicle which uses an electric motor and an engine as driving sources, a battery pack which contains a battery for supplying electric power to the motor is mounted.

The battery pack contains a plurality of battery modules in a battery containing member such as a battery pack tray.

As an example of the related art, a power supply device including a plurality of battery modules which are contained in a battery pack is disclosed in JP-A-2009-4323.

In JP-A-2009-4323, it is disclosed that a first battery group B1 is formed by electrically connecting a plurality of battery cells in series by means of bus bars (electrically connecting members), and a second battery group B2 is formed by connecting a plurality of battery cells in the same manner, and these battery groups are further connected by means of bus bars, thereby to form the power supply device.

In JP-A-2011-86634, it is disclosed that a plurality of battery cells are connected in series by means of bus bars thereby to form a battery module.

In order to form the power supply device by electrically connecting a plurality of the battery cells in series by means of the bus bars to form the battery modules, and further, by connecting these battery modules by means of the bus bars, as described in JP-A-2009-4323 and JP-A-2011-86634, it is necessary for the bus bars to protrude above the battery modules or to be connected to terminals of the adjacent battery modules by going around outside of the battery modules. Therefore, a space for installing the bus bars for the serial connection is required in the battery pack for containing a plurality of the battery modules, and so, it has been difficult to contain the battery modules in a compact manner.

An example of the serial connection of the battery modules by arranging the bus bars above the battery modules and between the adjacent battery modules is shown in FIG. 8. In FIG. 8, battery modules 01a to 01e which are formed by connecting a plurality of battery cells in series by means of inter-cell bus bars (not shown) are disposed in a tray 02 of a battery pack to be mounted on a vehicle.

The battery modules 01a to 01e are arranged in such a manner that their electrodes are positioned in the same direction in a vehicle anteroposterior direction. For this reason, in order to connect all the battery modules 01a to 01e in series, their positive electrodes and negative electrodes must be connected, by installing bus bars 03 so as to go across the battery modules 01a to 01e, and so as to pass through spaces between the adjacent battery modules.

In case where the spaces between the battery modules 01a to 01e and surrounding spaces are utilized, the bus bars need not protrude above the battery modules to go across them. However, in this case, there occurs such a problem that the battery pack for containing the battery modules is upsized, because the surrounding spaces must be secured.

Moreover, it is desired for the battery pack provided under the floor of the vehicle body to have the possible smallest height in a vertical direction, for the purpose of securing both a space for passengers and a height of the vehicle from the ground.

SUMMARY

The presently disclosed subject matter may provide a compact battery pack which is provided under a floor of a vehicle body and contains a plurality of battery modules, and capable of securing both a space for passengers and a height of the vehicle from the ground while restraining upsizing of the battery pack both in a vehicle width direction and in a vehicle anteroposterior direction, by reconsidering a shape and fitting structure of bus bars for connecting the battery modules in series inside the battery pack.

The battery pack mounted under a floor of a vehicle body and containing a plurality of battery modules may comprise: a tray having a substantially rectangular shape in a plan view and containing the battery modules, and a cover which is liquid-tightly attached to an upper face of the tray, wherein the battery modules inside the tray are arranged adjacent to each other in a vehicle anteroposterior direction in such a manner that a longitudinal direction of each battery module corresponds to a vehicle width direction, each battery module is provided with electrode terminals including a positive electrode terminal and a negative electrode terminal, in both end parts thereof in the vehicle width direction, the positive electrode terminal and the negative electrode terminal of the adjacent battery modules being adjacent to each other, bus bars for electrically connecting in series the positive electrode terminal and the negative electrode terminal of the adjacent battery modules include outer bus bars for interconnecting the electrode terminals in an outer part in the vehicle width direction, and inner bus bars for interconnecting the electrode terminals in a center part in the vehicle width direction, and the outer bus bars are provided so as not to protrude from upper faces of the battery modules thereby to interconnect the electrode terminals of the adjacent battery modules, and the inner bus bars are provided so as to pass above the upper faces of the battery modules thereby to interconnect the electrode terminals of the adjacent battery modules.

A center of the tray in the vehicle width direction may be substantially aligned with a center of the vehicle body in the vehicle width direction, and the battery modules inside the tray may be arranged in a plurality of rows in the vehicle anteroposterior direction, at both sides of the center of the tray in the vehicle width direction.

In each of the battery modules, the positive electrode terminal and the negative electrode terminal may be provided in both end parts in a longitudinal direction thereof, at a position offset to one side in a lateral direction thereof, and each of the outer bus bars may be provided so as to interconnect the electrode terminals of the adjacent battery modules.

Each of the inner bus bars may be provided so as to interconnect the electrode terminals of the adjacent battery modules, striding across faces of the adjacent battery modules which are opposed to each other in the vehicle anteroposterior direction, and the inner bus bar may be formed longer than the outer bus bar in length in the vehicle anteroposterior direction.

Each of the inner bus bars may be formed in a substantially C-shape or U-shape, having connection parts to be connected to the electrode terminals of the adjacent battery modules, at both ends thereof, and a coupling part coupling the connection parts and formed of a plate-like member which is positioned above the adjacent battery modules and which is in parallel with the upper faces of the adjacent battery modules.

DETAILED DESCRIPTION OF EXEMPLARY EMBODIMENTS

Figure 1:
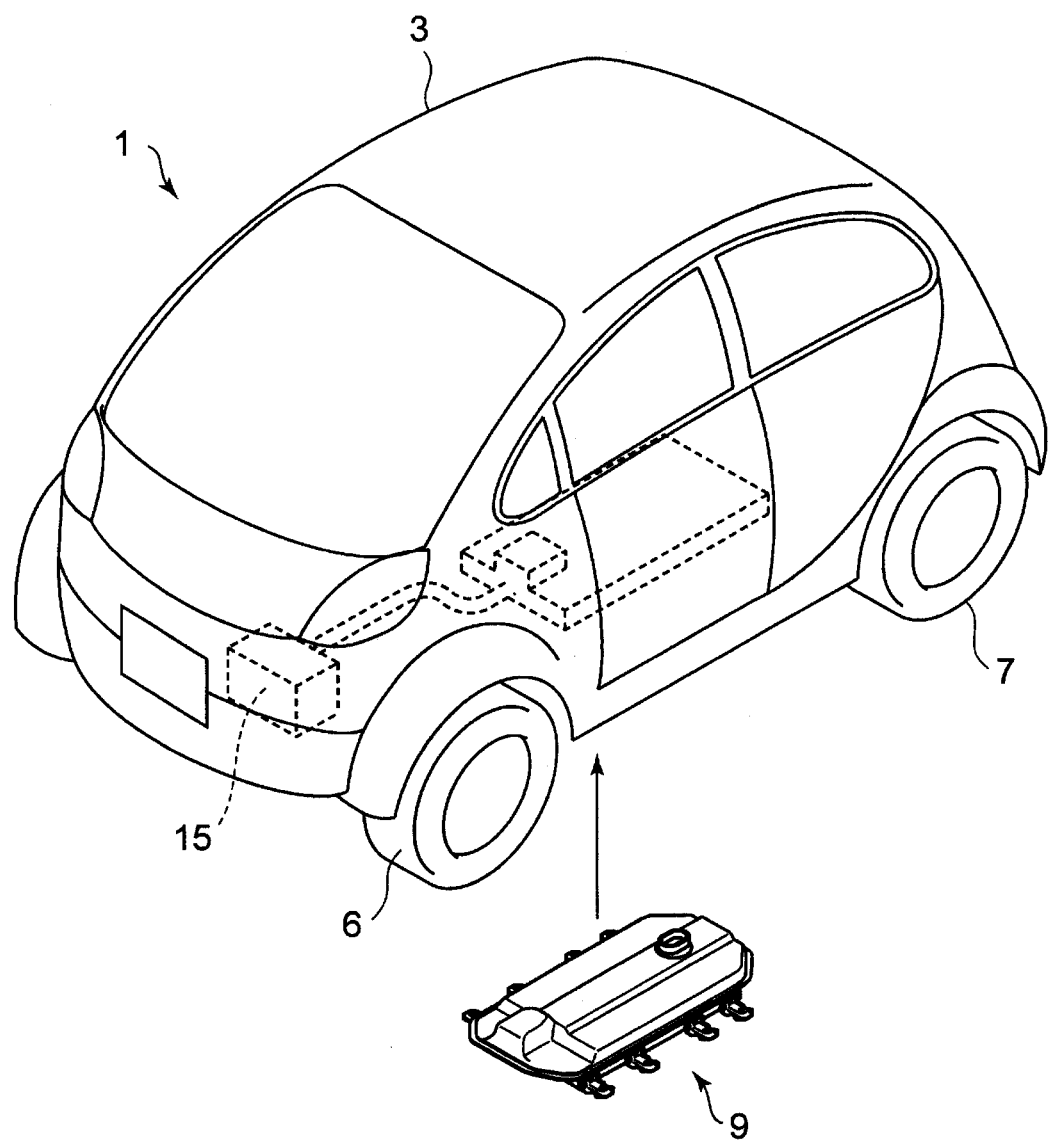
FIG. 1 is a schematic view of a vehicle on which a battery pack is to be mounted.

Now, an embodiment according to the invention will be described in detail, referring to the drawings. It is to be noted that sizes, materials, shapes of constituent components which are described in the embodiment, and relative arrangement of the constituent components do not limit a scope of the invention, but only exemplifies this invention, unless specifically described.

FIG. 1 is a perspective view showing an outer appearance of a vehicle, for example, an electric vehicle 1 which is provided with the battery pack according to the invention. The electric vehicle 1 has a floor panel 5 (See FIG. 7) in a lower part of a vehicle body 3, and a battery pack 9 is detachably attached to a lower face of the floor panel 5 at a position between front wheels 6 and rear wheels 7, from below of the vehicle body 3. An upper face of the floor panel 5 constitutes a part of a vehicle room.

Figure 7:
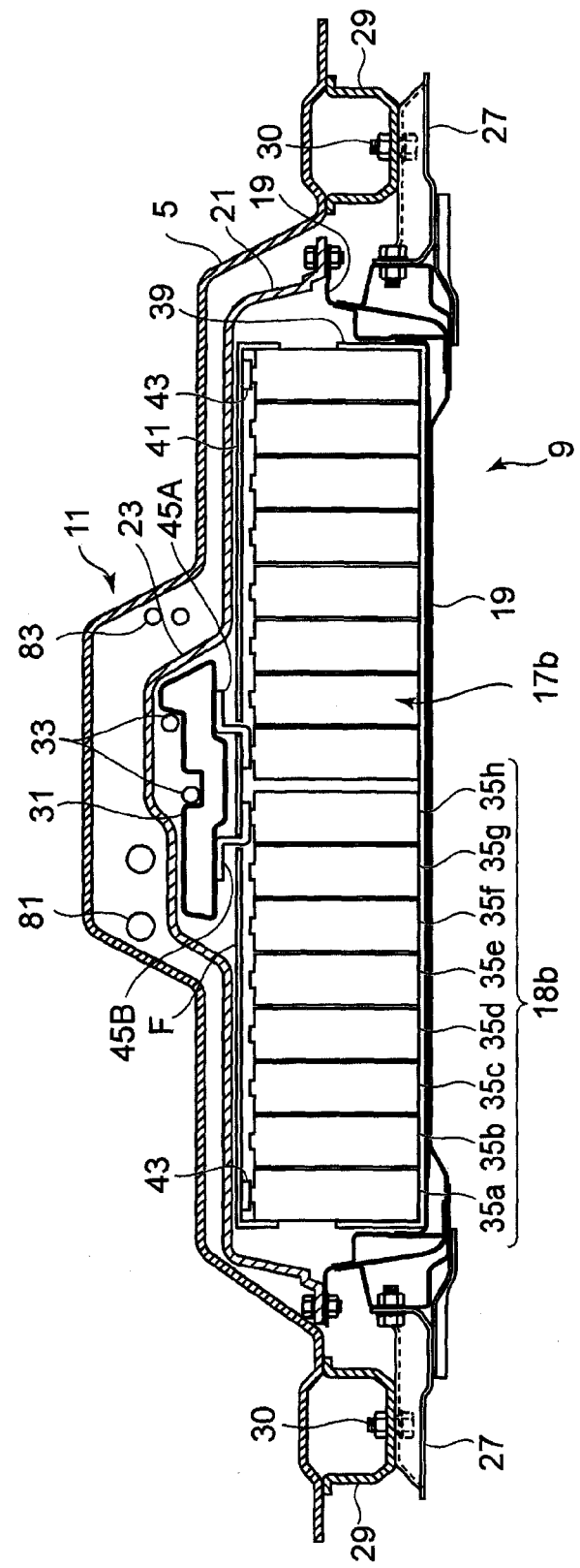
FIG. 7 is a sectional view taken along a line A-A in FIG. 3, showing a part in a state where the battery pack is mounted on the vehicle.
Figure 8:
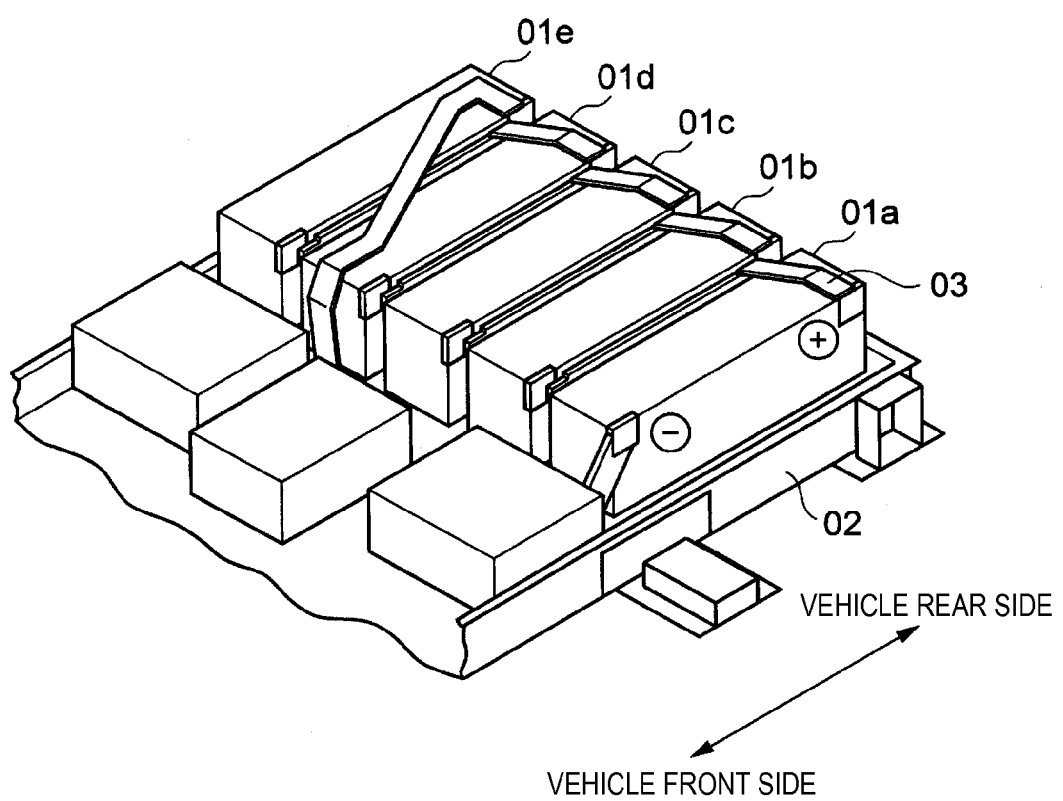
FIG. 8 is a perspective view showing arrangement of the battery modules and the bus bars in a reference example.

As shown in FIG. 7, the floor panel 5 has a floor tunnel 11 which is protruded upward along a vehicle anteroposterior direction of the vehicle body 3, and provided in a center part in a vehicle width direction. A convex part 23 which is protruded upward above an upper face of the battery pack 9 is disposed inside the floor tunnel 11.

Moreover, a controller 15 is connected to the battery pack 9, thereby to perform power supply control for controlling driving power by supplying electric power from the batteries to a driving motor via an inverter, power charging control for charging the battery, by recovering decelerated energy, and so on.

Figure 2:
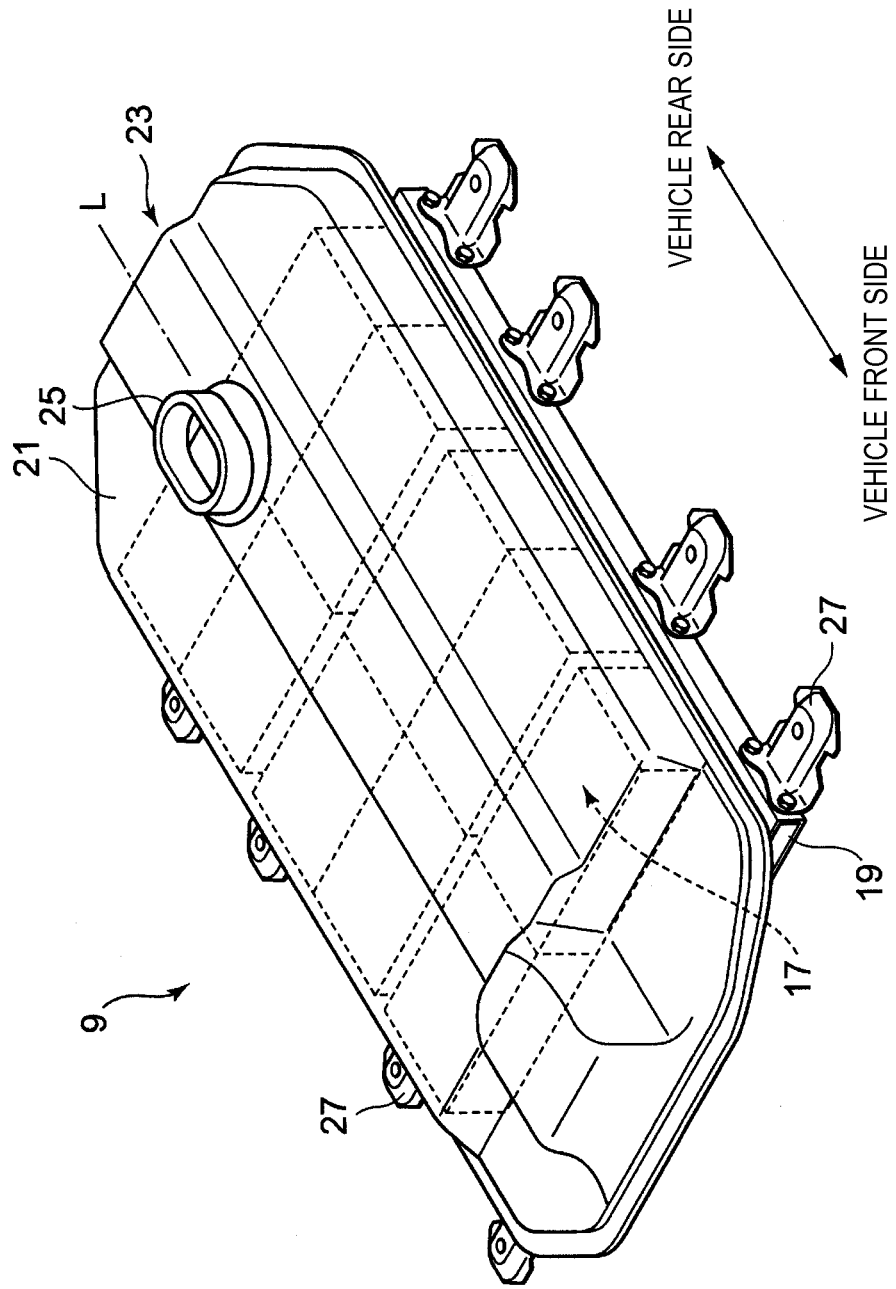
FIG. 2 is a perspective view showing an entirety of the battery pack.

As shown in FIG. 2, the battery pack 9 has a substantially rectangular shape which is longer in the vehicle anteroposterior direction, in a plan view. The battery pack 9 includes a battery pack tray (a tray) 19 on which battery modules 17 are placed, a cover member (a cover) 21 which is fitted to an upper face of the battery pack tray 19 interposing a seal member for liquid-tightly sealing an interior so that water and dust may not intrude into the battery pack tray 19, and further, a connecting circuit device for interconnecting the respective battery modules 17 inside the battery pack tray 19.

This battery pack tray 19 is molded of steel plate material, and the cover member 21 is molded of resin material.

Moreover, the convex part 23 in a convex shape is formed along the vehicle anteroposterior direction, in a center part of the cover member 21. This convex part 23 is provided with a maintenance window 25, at a side close to a rear part of the vehicle, and the floor panel 5 is provided with an opening for maintenance at a position corresponding to the maintenance window 25. As the results, an interior of the battery pack 9 can be confirmed from the vehicle room, and output of the battery can be monitored, and further, required maintenance work can be conducted, by interrupting the circuit on halfway.

Moreover, the battery pack tray 19 is provided with mounting brackets 27 for mounting the battery pack 9 to the vehicle body, at four positions on each of opposite sides thereof in the vehicle width direction. As shown in FIG. 7, the mounting brackets 27 are respectively fitted to lower faces of side frames 29 which constitute the vehicle body, by means of bolts 30.

A centerline L of the battery pack 9 which is mounted to the vehicle body is substantially aligned with a center of the vehicle body in the vehicle width direction.

Then, referring to FIG. 3, the interior of the battery pack tray 9 will be described.

Figure 3:
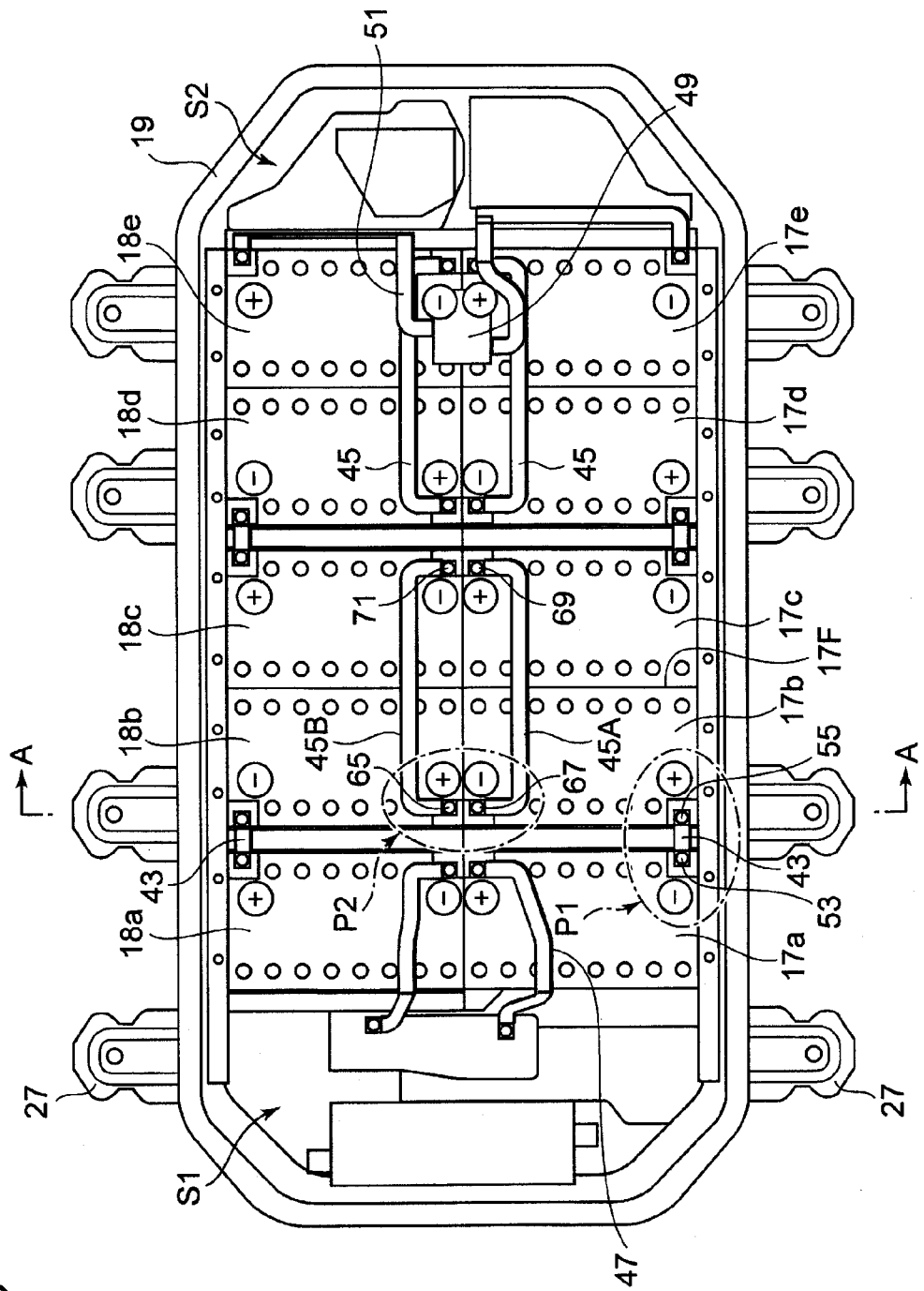
FIG. 3 is a plan view of the battery pack with its cover removed, showing arrangement of battery modules and bus bars.

FIG. 3 schematically shows, for easy understanding, arrangement of the battery modules 17, electrode terminals of the battery modules 17, and electric wirings, in a state where the cover member 21 of the battery pack 9 is removed, and further, a cooling duct 31, and output electric cables 33 for guiding outputs of the battery which are outputted forward of the vehicle to the rear are removed.

The battery modules 17, 18 are installed in the battery pack tray 19 so as to be adjacent to each other in the vehicle anteroposterior direction, by five pieces at respective opposite sides of the centerline L.

The battery modules 17, 18 are arranged having their longitudinal direction positioned in the vehicle width direction, and ten pieces in total of the battery modules 17a to 17e, 18a to 18e are arranged in order at right and left sides.

Each of the battery modules 17, 18 is formed by arranging, for example, eight pieces of battery cells 35a to 35h in parallel (See FIG. 7), and connecting electrode terminals of the battery cells in series by means of inter-cell bus bars (not shown). A single body thus formed in a substantially cubical shape is called as the battery module 17, 18.

Four partition members are provided in the vehicle width direction, inside the battery pack tray 19. Both ends of the partition members are bonded to wall faces of the battery pack tray 19 by welding, thereby to secure strength and rigidity of the battery pack tray 19.

The battery modules 17a, 18a at the right and left sides in a first row from the front are placed on a lower holder 39, and covered with an upper holder 41 from the above thereby to be assembled into one unit. The battery modules 17, 18 are fixed to a bottom face of the battery pack tray 19 per every unit.

The front and rear, right and left battery modules 17b, 17c, 18b, 18c in the second and third rows are held by another lower holder and another upper holder as one unit, and fixed to the bottom face of the battery pack tray 19.

In the same manner, the battery modules 17d, 18d in the fourth row and the battery modules 17e, 18e in the fifth row, which are the four battery modules positioned right and left, and front and rear are also contained as one unit.

Moreover, a fan for circulating a cooling air (not shown) inside the battery pack 9, and an evaporator for generating the cooling air are provided in a front space S1 where the battery modules 17, 18 are not provided. An air flow duct 31 for supplying the cooling air which is blown by the fan to the rear is provided along the centerline L, in the center part in the vehicle width direction (See FIG. 7). Further, electronic components such as contactors, fuses which are connection parts of the electric cables are provided in the front space S1 and in a rear space S2.

Respective two of the battery modules 17a to 17e, 18a to 18e which are adjacent to each other in the vehicle anteroposterior direction are arranged in opposite directions to each other, so that their electrode terminals are positioned at opposite sides between inside and outside, as shown in FIG. 3. All the battery modules 17a to 17e and all the battery modules 18a to 18e which are adjacent in the vehicle anteroposterior direction are respectively connected in series by means of bus bars 43, 45.

The bus bars 43, 45 mainly include the outer bus bars 43 for connecting the battery modules in outer parts in the vehicle width direction, and the inner bus bars 45 for connecting the battery modules in the center part in the vehicle width direction. There are further provided an output bus bar 47, a bus bar 51 to be connected to a maintenance breaker 49, and so on.

The inner bus bars 45 connect the battery modules in a region corresponding to the convex part 23 of the cover 21 which is protruded in conformity with the floor tunnel 11.

Figure 4:
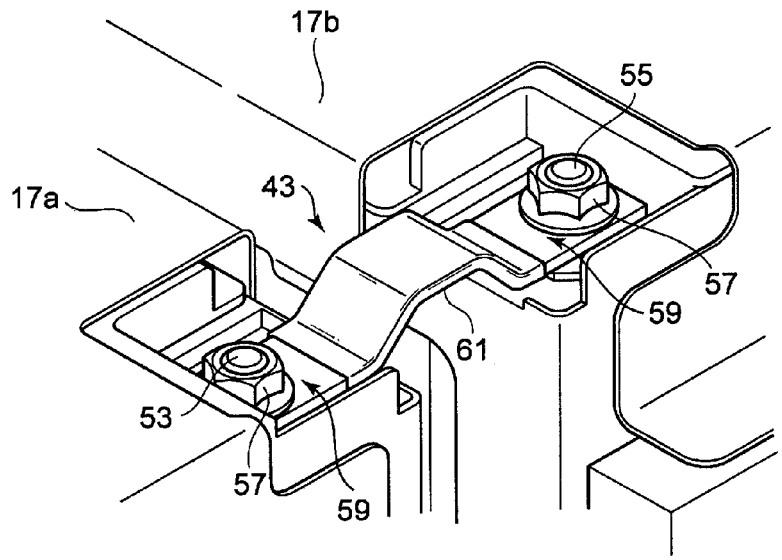
FIG. 4 is an enlarged perspective view of an encircled part P1 in FIG. 3.

Now, referring to FIG. 4, structure of the outer bus bar 43 and its connection part will be described. FIG. 4 is an enlarged view of an encircled part P1 in FIG. 3. Although the description will be made referring to the enlarged view of the part P1, the other outer bus bars have substantially the same structure.

FIG. 4 shows a case where the outer bus bar 43 connects a negative electrode terminal 53 of the battery module 17a in the first row and a positive electrode terminal 55 of the battery module 17b in the second row. The negative electrode terminal 53 and the positive electrode terminal 55 are positioned adjacent to each other. At the same time, the negative electrode terminal 53 is provided at a position lower than an upper face of the battery module 17a. In the same manner, the positive electrode terminal 55 is provided at a position lower than an upper face of the battery module 17b.

The electrode terminals including the positive electrode terminal 55 and the negative electrode terminal 53 are provided at both ends in a longitudinal direction of the battery module, at positions offset to one side in a lateral direction of the battery module. Further, in the two battery modules which are adjacent in the vehicle anteroposterior direction, the positive electrode terminal 55 and the negative electrode terminal 53 are arranged at opposite sides to each other, between outside and inside in the vehicle width direction, as described above. As the results, the positive electrode terminal 55 and the negative electrode terminal 53 are arranged adjacent to each other, as shown in FIG. 3.

On the other hand, the battery modules 17b and 17c are disposed in contact with each other, between their faces where the positive electrode terminal 55 and the negative electrode terminal 53 are not arranged adjacent to each other.

The outer bus bar 43, which is formed of a plate-like material, has connection parts 59 to be fastened to the electrode terminals with nuts 57, at both ends thereof, and a coupling part 61 which is formed between the connection parts 59 and curved upward in an intermediate part thereof. Since this coupling part 61 is curved upward, the plate-like curved shape can absorb displacement of the battery modules 17a, 17b, even though the battery modules 17a, 17b are longitudinally and vertically displaced due to vibration of the vehicle while running. Therefore, it is possible to prevent occurrence of damage or crack of the outer bus bar 43.

Moreover, respective tip ends of the negative electrode terminal 53 and the positive electrode terminal 55 do not protrude from the upper faces of the battery modules 17a, 17b, and further, a top of the curved part of the outer bus bar 43 does not protrude from the upper faces of the battery modules 17a, 17b. Accordingly, it is possible to depress a height of the cover 21.

Further, since the negative electrode terminal 53 and the positive electrode terminal 55 are at positions opposed to each other, a work for fitting the outer bus bar 43 can be easily performed.

Figure 5:
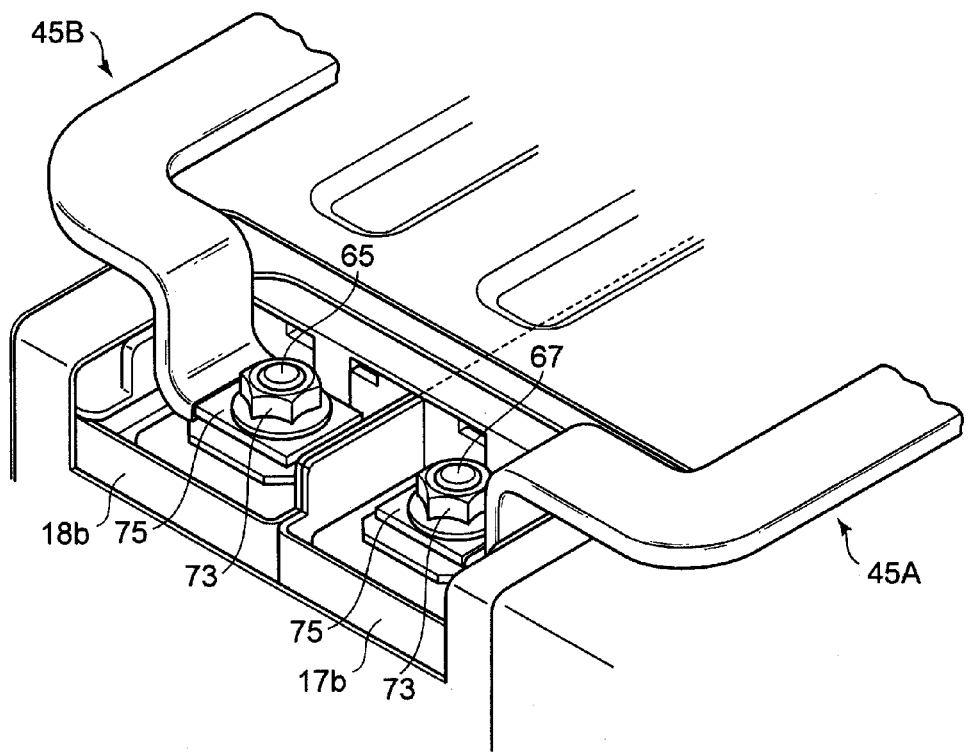
FIG. 5 is an enlarged perspective view of an encircled part P2 in FIG. 3.

Then, referring to FIG. 5, structure of the inner bus bar 45 and its connection part will be described. FIG. 5 is an enlarged view of an encircled part P2 in FIG. 3. Although the description will be made referring to the enlarged view of the part P2, the other inner bus bars have substantially the same structure.

FIG. 5 shows the inner bus bar 45 which is positioned in a region containing a positive electrode terminal 65 of the battery module 18b in the second row and a negative electrode terminal 67 of the battery module 17b in the second row.

These negative electrode terminal 67 and positive electrode terminal 65 are positioned adjacent to each other in the right side row and in the left side row, and provided at positions lower than the upper faces of the battery modules 17b, 18b, in the same manner as the above described positive electrode terminal 55 and the negative electrode terminal 53. The inner bus bar 45 is not intended to interconnect these battery modules 17b, 18b, but interconnects the battery modules in the front and rear rows, as described below.

As shown in FIG. 3, the inner bus bar 45A interconnects the negative electrode terminal 67 of the battery module 17b in the second row and a positive electrode terminal 69 of the battery module 17c in the third row. Moreover, the inner bus bar 45B which is opposed to the inner bus bar 45A interconnects the positive electrode terminal 65 of the battery module 18b and a negative electrode terminal 71 of the battery module 18c.

Figure 6:
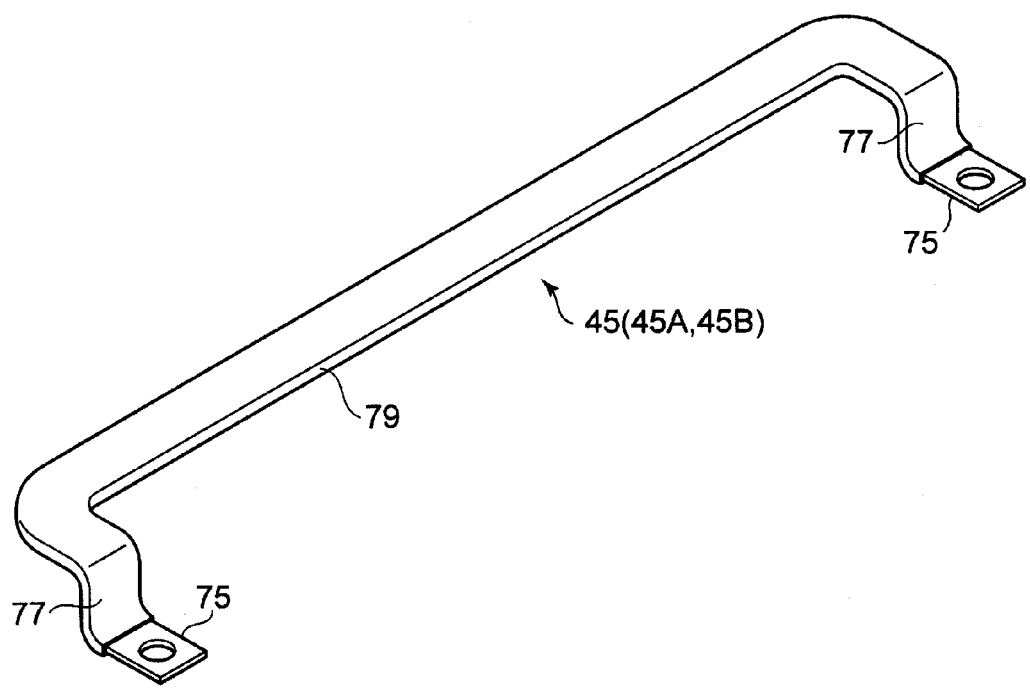
FIG. 6 is a perspective view showing an entirety of an inner bus bar.

The inner bus bar 45A and the inner bus bar 45B are the same components. As shown in FIG. 6, each of the inner bus bars 45A, 45B is provided with connection parts 75 to be fastened to the electrode terminals with nuts 73, at both ends thereof, and has erected parts 77 which are respectively erected from the connection parts 75 to be positioned higher than the upper faces of the battery modules, and a coupling part 79 which is formed of a plate-like member in parallel with the upper faces of the battery modules and positioned higher than the upper faces of the battery modules. An outer shape of the inner bus bar 45A, 45B is in a substantially C-shape or U-shape in a plan view, as shown in FIG. 6, and in a substantially C-shape or U-shape, also in a side view.

As described above, the inner bus bar 45A is provided higher than the upper faces of the battery modules 17b, 17c, and interconnects their electrode terminals so as to stride across faces 17F (See FIG. 3) of the battery modules 17b, 17c which are opposed to each other in the vehicle anteroposterior direction. Therefore, a space between the battery modules 17b and 17c in the vehicle anteroposterior direction is substantially eliminated, and the battery modules can be disposed in parallel and in contact with each other. As the results, it is possible to reduce a length of the battery pack 9 in the vehicle anteroposterior direction, and the battery pack 9 can be downsized.

The inner bus bar 45B too is provided so as to stride across faces of the battery modules 18b, 18c which are opposed to each other. The case is the same between the other battery modules 17d and 17e, and between the battery modules 18d and 18e.

Moreover, either of the inner bus bars 45A, 45B has a substantially C-shape or U-shape, both in a plan view and in a side view, and has the coupling part 79 which is formed of the plate-like member in parallel with the upper faces of the battery modules 17b and 17c. Therefore, even though the battery modules vibrate in the longitudinal direction, lateral direction, and vertical direction, with vibrations of the vehicle while running, a remarkable vibration absorbing effect can be obtained.

Specifically, vertical vibrations of the battery modules can be absorbed by vertical displacements of the coupling part 79 formed of the plate-like member. Moreover, since the coupling part 79 has a length as long as a width of two pieces of the battery modules 17b, 17c, vibrations of the battery modules in the lateral direction (vehicle width direction) can be also absorbed by lateral displacements of the coupling part 79.

Further, since the inner bus bars 45A, 45B have the substantially C-shape or U-shape in a plan view, the vibrations of the battery modules in the longitudinal direction can be also absorbed by deformation of an open part of the C-shape.

FIG. 7 is a schematic sectional view taken along a line A-A in FIG. 3, in a state where the battery pack 9 is mounted on the vehicle body. Pipes 81 and electric cables 83 for the vehicle are provided inside the floor tunnel 11, and the convex part 23 formed on the upper face of the battery pack 9 is disposed below the pipes 81 and the electric cables 83.

As already described above, when the battery pack 9 is mounted on the vehicle body, the both ends of the battery pack 9 are fixed to the lower faces of the right and left side frames 29, 29 which are formed on the lower face of the floor panel 5 along the vehicle anteroposterior direction, by means of the bolts 30. Therefore, the battery pack 9 is held under the floor of the vehicle, only at the both sides thereof in the vehicle width direction.

The air flow duct 31 is provided inside the convex part 23 of the battery pack 9, and the output electric cables 33 are disposed between the air flow duct 31 and the inner face of the cover 21. Moreover, the inner bus bars 45A, 45B are passed through a space between the air flow duct 31 and the upper faces of the battery modules 17b, 18b. A cooling effect with respect to the inner bus bars 45A, 45B is obtained by the cooling air flowing through the air flow duct 31.

The inner bus bars 45A, 45B are positioned within a region corresponding to the interior of the convex part 23 of the battery pack 9.

Since a floor structure in the center part in the vehicle width direction is formed as the floor tunnel 11, it is possible to dispose the inner bus bars 45A, 45B above the battery modules, utilizing a region enlarged by the floor tunnel 11. As the results, it is possible to secure a space for passengers and a height of the vehicle from the ground at the same time, while restraining an increase of the height of the battery pack in its entirety, and it is possible to arrange the battery modules in proximity to each other.

As described above, in this embodiment, for the purpose of connecting in series the battery modules which are contained in the battery pack tray of the battery pack 9, the positive electrode terminal and the negative electrode terminal of the adjacent battery modules are arranged so as to be adjacent to each other, and connected by the shorter outer bus bar 43 in the outer part in the vehicle width direction. In the center part in the vehicle width direction, the electrode terminals are connected by the inner bus bar 45 which is longer than the outer bus bar 43 in a manner of passing through the space above the battery modules so as to stride across the faces 17F of the battery modules 17b and 17c which are opposed to each other in the vehicle anteroposterior direction. Therefore, it is possible to obtain the compact battery pack 9 capable of securing the space for passengers and the height of the vehicle from the ground at the same time, while restraining upsizing of the battery pack both in the vehicle width direction and in vehicle anteroposterior direction.

According to an aspect of the invention, the outer bus bars in the outer part in the vehicle width direction are provided so as not to protrude from the upper faces of the battery modules thereby to interconnect the electrode terminals of the adjacent battery modules. On the other hand, the inner bus bars are provided so as to pass above the upper faces of the battery modules thereby to interconnect the electrode terminals of the adjacent battery modules in a manner of striding across the battery modules.

Generally, a floor structure in a center part of the vehicle width direction is formed as a floor tunnel structure, and so, it is possible to dispose the inner bus bars, utilizing an enlarged space under the floor. As the results, increase of a height of the entire battery pack is restrained, and it is possible to secure both a space for passengers and a height of the vehicle from the ground.

Moreover, the inner bus bars are provided so as to pass above the upper faces of the battery modules thereby to interconnect the electrode terminals of the adjacent battery modules in a manner of striding across the battery modules. Therefore, it is possible to dispose the inner bus bars without forming a large space between the battery modules, and thus, downsizing of the battery pack can be achieved.

According to an aspect of the invention, the battery modules are arranged adjacent to each other in a plurality of rows in the vehicle anteroposterior direction, in such a manner that the longitudinal direction of the battery modules corresponds to the vehicle width direction, and further, the battery modules are arranged at both sides of the center in the vehicle width direction. Therefore, it is possible to contain a number of battery packs in a compact space.

According to an aspect of the invention, since the positive electrode terminal and the negative electrode terminal of the adjacent battery modules are disposed adjacent to each other, the outer bus bar only has to connect a rectilinear short distance between them. Therefore, connecting work during an assembling step is facilitated.

Moreover, since the outer bus bars are provided so as not to protrude from the upper faces of the battery modules, increase of the height of the battery pack can be restrained, and hence, the height of the vehicle from the ground can be advantageously secured.

According to an aspect of the invention, the inner bus bar is formed longer than the outer bus bar in length in the vehicle anteroposterior direction. Therefore, in such a structure that the battery pack is mounted on the vehicle body only at both sides of the tray in the vehicle width direction, vibration of the battery pack while the vehicle is running can be effectively absorbed, and hence, occurrence of trouble such as damage of the inner bus bar can be restrained.

Specifically, since the battery pack is mounted on the vehicle body in a state where both sides thereof are supported by the vehicle body, an amount of displacement due to the vibration while the vehicle is running is small, in the outer bus bar which is positioned close to the mounting position. On the other hand, in the center part in the vehicle width direction which is remote from the mounting position, the vibration increases and the amount of displacement tends to increase.

Since the inner bus bar is formed longer in the vehicle anteroposterior direction and easily deformed, it is possible to obtain vibration absorbing effect against the vibration in the center part in the vehicle width direction.

According to an aspect of the invention, the inner bus bar is formed in a substantially C-shape or U-shape, having the connection parts and the coupling part, and the coupling part is formed of the plate-like member which is positioned above the battery modules in parallel with the upper faces of the battery modules. Therefore, the above described vibration absorbing effect while the vehicle is running can be more advantageously obtained by deformation of the plate-like member, or deformation of the substantially C-shape or U-shape.

According to an aspect of the invention, the outer bus bars in the outer part in the vehicle width direction are provided so as not to protrude from the upper faces of the battery modules thereby to interconnect the electrode terminals of the adjacent battery modules. On the other hand, the inner bus bars are provided so as to pass above the upper faces of the battery modules thereby to interconnect the electrode terminals of the adjacent battery modules. As the results, upsizing of the entire battery pack both in the vehicle anteroposterior direction and in the vehicle width direction is restrained, and it is possible to obtain a compact battery pack capable of securing both the space for passengers and the height of the vehicle from the ground.

Moreover, the inner bus bar is formed longer than the outer bus bar in length in the vehicle anteroposterior direction, and further, the inner bus bar is formed in a substantially C-shape or U-shape. Therefore, in case where the structure of mounting the battery pack on the vehicle body only at the both sides in the vehicle width direction is adopted, the vibration absorbing effect is exerted against increase of vibration in the center part in the vehicle width direction of the vehicle while the vehicle is running, and hence, occurrence of trouble such as damage, crack of the inner bus bar can be restrained.

According to an aspect of the invention, the arrangement of the battery modules, the shape and fitting structure of the bus bars have been reconsidered, and upsizing of the battery pack both in the vehicle width direction and in the vehicle anteroposterior direction is restrained. Moreover, it is possible to secure the space for passengers and the height of the vehicle from the ground at the same time, and therefore, the invention can be advantageously applied to the battery pack to be mounted on the vehicle.

What is claimed is:

1. A battery pack mounted under a floor of a vehicle body and containing a plurality of battery modules, the battery pack comprising:
   a tray having a substantially rectangular shape in a plan view and containing the battery modules, and a cover which is liquid-tightly attached to an upper face of the tray, wherein
   the battery modules inside the tray are arranged adjacent to each other in a vehicle anteroposterior direction in such a manner that a longitudinal direction of each battery module corresponds to a vehicle width direction,
   each battery module is provided with electrode terminals including a positive electrode terminal and a negative electrode terminal, in both end parts thereof in the vehicle width direction, the positive electrode terminal and the negative electrode terminal of the adjacent battery modules being adjacent to each other, and the electrode terminals being provided at positions lower than an upper surface of the each battery module,
   bus bars for electrically connecting in series the positive electrode terminal and the negative electrode terminal of the adjacent battery modules include outer bus bars for interconnecting the electrode terminals in an outer part in the vehicle width direction, and inner bus bars for interconnecting the electrode terminals in a center part in the vehicle width direction, and
   the outer bus bars being connected to the electrode terminal at the positions lower than the upper surface of the each battery module, such that each outer bus bar extends between adjacent electrode terminals at a position lower than the upper surface of the each battery module to interconnect the electrode terminals of the adjacent battery modules, and the inner bus bars are provided so as to pass above the upper faces of the battery modules thereby to interconnect the electrode terminals of the adjacent battery modules.

2. The battery pack according to claim 1, wherein a center of the tray in the vehicle width direction is substantially aligned with a center of the vehicle body in the vehicle width direction, and the battery modules inside the tray are arranged in a plurality of rows in the vehicle anteroposterior direction, at both sides of the center of the tray in the vehicle width direction.

3. The battery pack according to claim 1, wherein, in each of the battery modules, the positive electrode terminal and the negative electrode terminal are provided in both end parts in a longitudinal direction thereof, at a position offset to one side in a lateral direction thereof, and each of the outer bus bars is provided so as to interconnect the electrode terminals of the adjacent battery modules.

4. The battery pack according to claim 3, wherein each of the inner bus bars is provided so as to interconnect the electrode terminals of the adjacent battery modules, striding across faces of the adjacent battery modules which are opposed to each other in the vehicle anteroposterior direction, and the inner bus bar is formed longer than the outer bus bar in length in the vehicle anteroposterior direction.

5. The battery pack according to claim 1, wherein each of the inner bus bars is formed in a substantially C-shape or U-shape, having connection parts to be connected to the electrode terminals of the adjacent battery modules, at both ends thereof, and a coupling part coupling the connection parts and formed of a plate-like member which is positioned above the adjacent battery modules and which is in parallel with the upper faces of the adjacent battery modules.

* * * * *